US012561814B2

(12) United States Patent
Wu et al.

(10) Patent No.: US 12,561,814 B2
(45) Date of Patent: Feb. 24, 2026

(54) VESSEL TRACKING AND MONITORING SYSTEM AND OPERATING METHOD THEREOF

(71) Applicant: SHIP AND OCEAN INDUSTRIES R&D CENTER, New Taipei (TW)

(72) Inventors: Chia-Yu Wu, Kaohsiung (TW); Yan-Sheng Song, Kaohsiung (TW); Yu-Ting Peng, Kaohsiung (TW); Chien-Hung Liu, Kaohsiung (TW)

(73) Assignee: SHIP AND OCEAN INDUSTRIES R&D CENTER, New Taipei (TW)

( * ) Notice: Subject to any disclaimer, the term of this patent is extended or adjusted under 35 U.S.C. 154(b) by 324 days.

(21) Appl. No.: 18/082,574

(22) Filed: Dec. 15, 2022

(65) Prior Publication Data

US 2024/0104746 A1    Mar. 28, 2024

(30) Foreign Application Priority Data

Sep. 28, 2022    (TW) ................................. 111136872

(51) Int. Cl.
| | |
|---|---|
| *H04N 23/69* | (2023.01) |
| *G06T 7/20* | (2017.01) |
| *G06T 7/70* | (2017.01) |
| *G06V 10/98* | (2022.01) |
| *G06V 20/52* | (2022.01) |
| *H04N 7/18* | (2006.01) |
| *H04N 23/695* | (2023.01) |

(52) U.S. Cl.
CPC .................. *G06T 7/20* (2013.01); *G06T 7/70* (2017.01); *G06V 10/993* (2022.01); *G06V 20/52* (2022.01); *H04N 7/18* (2013.01); *H04N*

23/69 (2023.01); *H04N 23/695* (2023.01); *G06T 2207/30232* (2013.01)

(58) Field of Classification Search
CPC .. H06T 7/20; H06T 7/70; G06V 20/52; G06V 10/993; H04N 23/69; H04N 23/695; H04N 7/18
USPC .......................................... 348/143
See application file for complete search history.

(56) References Cited

U.S. PATENT DOCUMENTS

| | | | |
|---|---|---|---|
| 2006/0244826 A1* | 11/2006 | Chew | ..................... G06T 7/254 |
| | | | 348/E7.086 |
| 2020/0098273 A1* | 3/2020 | Kim | ..................... G06V 20/17 |
| 2020/0365035 A1 | 11/2020 | Im et al. | |

FOREIGN PATENT DOCUMENTS

| | | |
|---|---|---|
| CN | 106910204 A | 6/2017 |
| CN | 110060281 A | 7/2019 |
| CN | 110517280 A | 11/2019 |
| CN | 111339977 A | 6/2020 |
| CN | 113489893 A | 10/2021 |

(Continued)

*Primary Examiner* — Nguyen T Truong
(74) *Attorney, Agent, or Firm* — Cheng-Ju Chiang

(57) ABSTRACT

The present invention discloses a vessel tracking and monitoring system and operating method thereof. Specifically, the vessel tracking and monitoring system comprises at least one camera, a processing module and a storage module. On the other hand, the processing module may keep the water object which is detected and recognized by the at least one camera in the center area of a monitoring screen. Therefore, the present invention may track and recognize the type of the at least one water object, assisting areas such as ports in managing and tracking water object arrivals and departures under various environmental conditions.

21 Claims, 5 Drawing Sheets

10

(56)               References Cited

FOREIGN PATENT DOCUMENTS

| CN | 113507577 A | 10/2021 |
|----|-------------|---------|
| CN | 113990108 A | 1/2022 |
| CN | 114140753 A | 3/2022 |
| CN | 114267012 A | 4/2022 |
| CN | 114821494 A | 7/2022 |

* cited by examiner

10

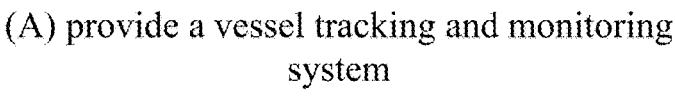

(A) provide a vessel tracking and monitoring system (B) keep at least one camera on standby until at least one water object enters the photographing range of the at least one camera, and transmit the monitoring screen containing the at least one water object to the processing module (C) performs the object detection based on at least one water object on the at least one monitoring screen by the processing module, and confirms the position of the at least one water object on the at least one monitoring screen (D) the processing module will control at least one camera to rotate according to the distance between the position of the at least one water object on the at least one monitoring screen and the center range of the at least one monitoring screen, and move the at least one water object to the center range of the at least one monitoring screen (E) the processing module controls at least one camera to keep the at least one water object within the central range of the at least one monitoring screen at any time

Fig. 2

VESSEL TRACKING AND MONITORING SYSTEM AND OPERATING METHOD THEREOF

TECHNICAL FIELD

The present invention relates to a vessel tracking and monitoring system and operation method thereof, and more particularly, to indicate one that can keep at least one water object identified and detected by the at least one camera in the central range of a monitoring screen at any time, and assist areas such as ports to manage and track the arrival and departure of vessels under various environmental conditions.

BACKGROUND OF RELATED ARTS

Generally speaking, there are often a large number of water objects, such as vessels, which frequently navigate and come in and out of the port and the sea line. In general, if relies on manpower, it will be difficult to do a good job of ship access management near the port in a limited time and cost. At the same time, in case of an accident to a ship at sea, it is difficult to notice and send a rescue at the first time.

Even accompanying with the CCTV, it has been a long time to install CCTV on the shore for monitoring. However, the use of most monitoring still depends on manual inspection. Similarly, for the operators of fleets operating recreational yachts in ports, the management of ships in their fleets is also a challenge.

Therefore, at present, there is a lack of an effective and accurate automatic management system for vessels near ports or sea lines. At present, there is an urgent need for an accurate and automated vessel tracking management system to help people manage things near the port more efficiently.

SUMMARY

In order to solve the problem of the prior art, the purpose of the present invention is to provide a vessel tracking and monitoring system and its operation method. Specifically, the vessel tracking and monitoring system of the invention comprises at least one camera, a processing module and a storage module.

The at least one camera has at least three-dimensional camera movement capability, and capturing at least one monitoring picture. The processing module is connected with the at least one camera. The processing module performs an object detection based on at least one water object on the at least one monitoring picture.

The processing module confirms a location of the at least one water object on the at least one monitoring picture, controlling a rotation of the at least one camera to move the at least one water object to a central range of the at least one monitoring picture based on a distance between the location of the at least one water object on the at least one monitoring picture and the central range of the at least one monitoring picture, and keeping the at least one water object at the central range of the at least one monitoring picture.

The storage module stores a data set of at least one water object. The data set of the at least one water object provides to the processing module to detect and identify the location and type of the at least one water object.

An operating method of a vessel tracking and monitoring system of the present invention comprises the following steps. First, the step (A) is providing a vessel tracking and monitoring system. Next, the step (B) is keeping at least one camera on standby until at least one water object enters a photographing range of the at least one camera, and transmitting at least on monitoring picture containing the at least one water object to a processing module.

Subsequently, the step (C) is performing an object detection based on the at least one water object on the at least one monitoring picture by the processing module, and confirming a location of the at least one water object on the at least one monitoring picture. Then, the step (D) is controlling the at least one camera to rotate by the processing module based on a distance between the location of the at least one water object on the at least one monitoring picture and a central range of the at least one monitoring picture, and move the at least one water object to the central range of the at least one monitoring picture.

Finally, the step (E) is controlling the at least one camera by the processing module to keep the at least one water object within the central range of the at least one monitoring picture.

Embodiments of the invention are illustrated by way of example, and not by way of limitation, in the figures of the accompanying drawings in which like reference numerals refer to similar elements.

BRIEF DESCRIPTION OF THE DRAWINGS

FIG. 2 illustrates a flow chart of the operation method of the embodiment of the vessel tracking and monitoring system of the present invention.

DETAILED DESCRIPTION OF THE INVENTION

In order to understand the technical features and practical efficacy of the present invention and to implement it in accordance with the contents of the specification, hereinafter, preferred embodiments of the present invention will be described in detail with reference to the accompanying drawings.

The "connection" mentioned in this embodiment does not actually have absolute limitation in space and location. Specifically, the term of "connection" should reasonably be understood as any physical connection that can realize the function. The physical connection includes mechanical connection, electrical connection, wired connection or wireless connection, and the invention is not limited to these.

Figure 1:
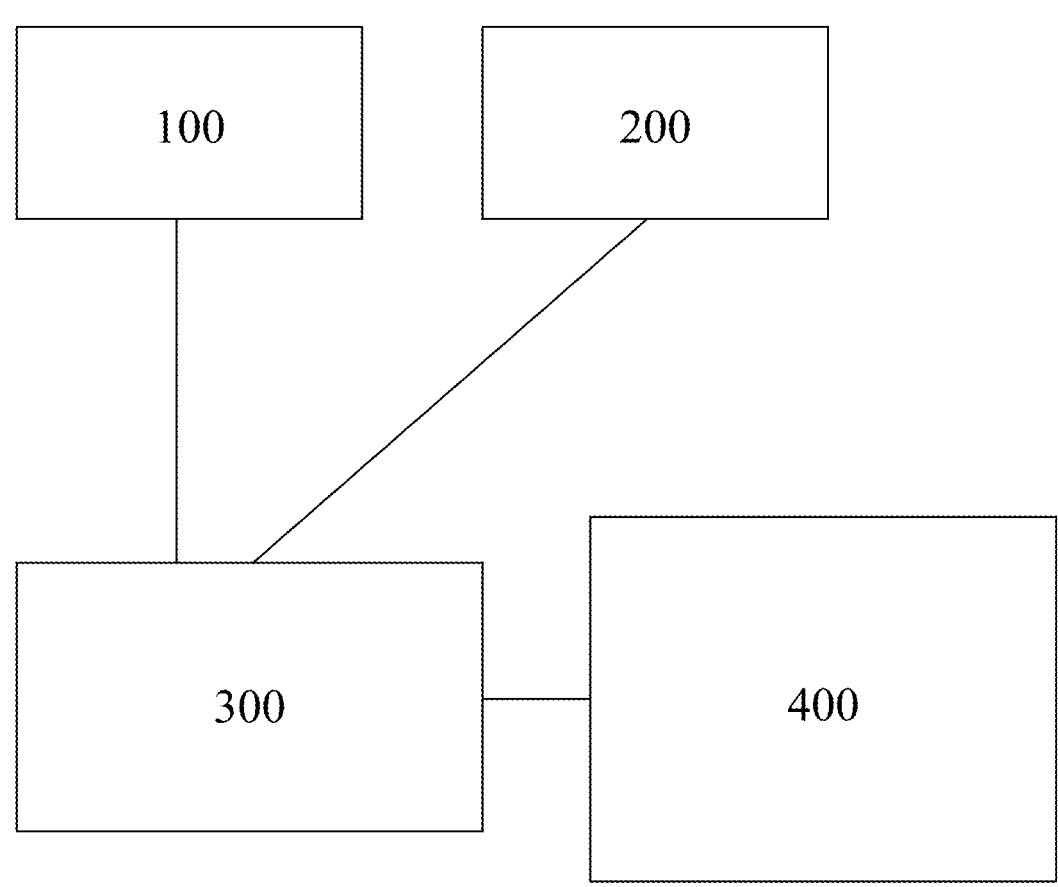
FIG. 1 illustrates a schematic diagram of the embodiment of a vessel tracking and monitoring system of the present invention.

First, please refer to FIG. 1, it illustrates a schematic diagram of the embodiment of a vessel tracking and monitoring system of the invention. As shown in FIG. 1, the vessel tracking and monitoring system 10 in this embodiment includes at least one camera 100, a processing module 300 and a storage module 400. In this embodiment, the processing module 300 is connected with the invisible light camera 200. Specifically, the invisible light camera 200 in this embodiment can be realized by using invisible light sensing technology such as thermal imaging. In case of insufficient visible light, such as at night or in rainy day, it can play an auxiliary role in tracking and identification.

In addition, on the condition that the visible light is sufficient, the camera 100 of this embodiment is only drawing a single one. However, in fact, the number of cameras 100 can be set as a plurality according to the geographical location of different ports, and the invention does not limit thereto.

Specifically, the camera 100 used in this embodiment has at least three-dimensional camera movement capability. The at least three-dimensional camera movement capability can be a picture control capability of three dimensions, namely, Pan, Tile and Zoom. Furthermore, for the rotation required for the above camera movement, 120 degrees is the best rotation angle of the camera 100 per second used in this embodiment. In some embodiments, for example, the camera 100 may built-in invisible light sensing function such as thermal imaging, the use of the invisible light camera 200 can also be avoided, and the invention is not limited to this.

Figure 3:
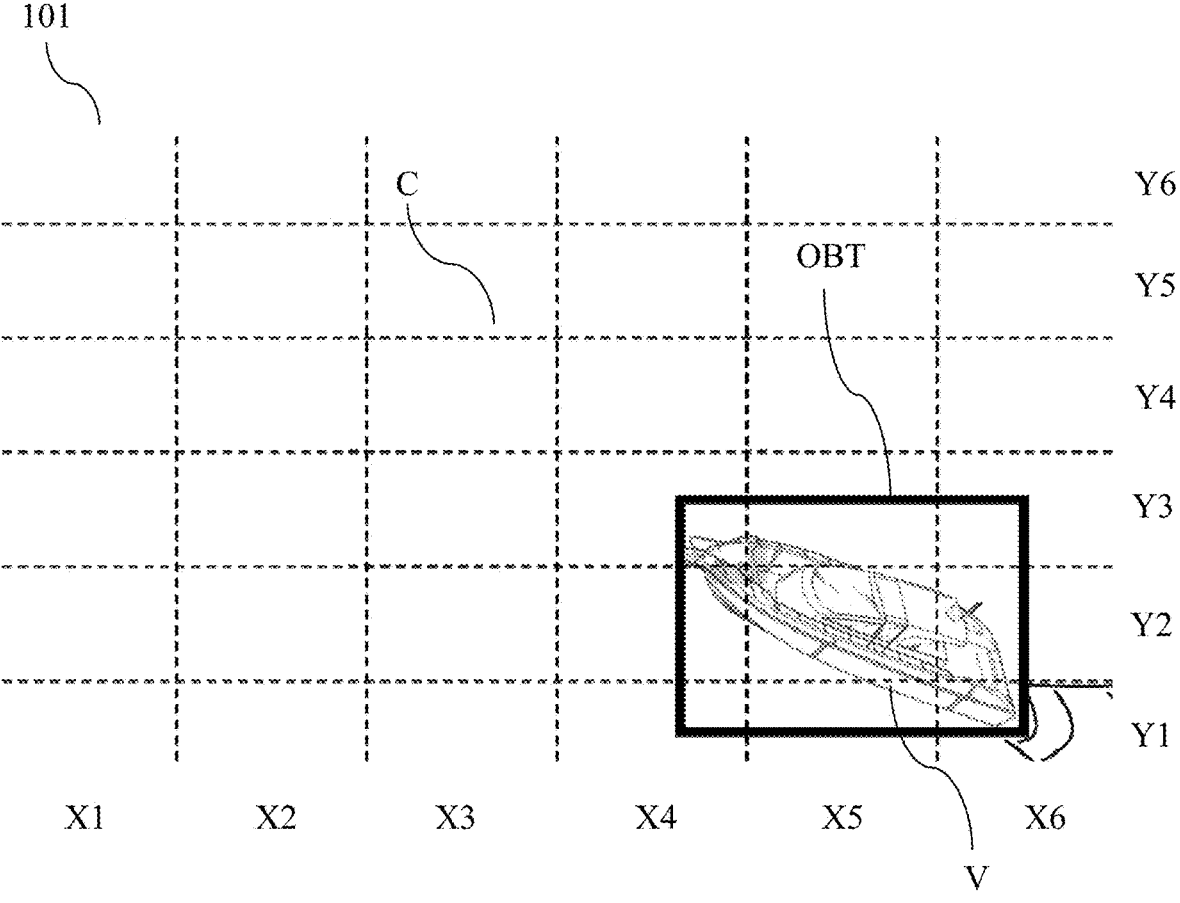
FIG. 3 illustrates a schematic diagram of adjustment of the monitoring screen of the embodiment of the vessel tracking and monitoring system of the present invention.

At least one camera 100 of this embodiment can shoot at least one monitoring screen (picture) 101 according to the set number(s) per se (refer to FIG. 3). Specifically, the monitoring screen 101 captured by each camera 100 is illustrated for the convenience of explaining this embodiment. In fact, the monitoring screen 101 can be output and displayed when the processing module 300 is connected with a screen or a display terminal device, and the invention does not limit thereto.

Therefore, the processing module 300 of this embodiment is connected to at least one camera 100, and the processing module 300 can perform object detection according to the water object V appearing in each monitoring screen 101 (that is, entering the shooting range of the camera 100).

In this embodiment, the water object V can include but not limited to any aquatic object V that can shake with the waterbody. Specifically, the waterborne object V described in the embodiment can be a waterborne vehicle or other waterborne artifacts, including but not limited to life buoy, drifter or vessel, and the invention is not limited these.

Moreover, the processing module 300 of this embodiment can confirm that the location of the water object V on the monitoring screen 101 through the monitoring screen 101 of the camera 100, and then control the rotation of the camera 100 corresponding to the monitoring screen 101 to move the water object V to the central range C of the monitoring screen 101 according to the distance between the position of the water object V on the monitoring screen 101 and the central range C of the monitoring screen 101. Finally, the aquatic object V is kept at the central range C of the monitoring screen 101 at any time.

In this embodiment, the so-called "the processing module 300 controls the rotation of the camera 100 corresponding to the monitoring screen 101 according to the distance between the position of the water object V on the monitoring screen 101 and the central range C of the monitoring screen 101" means that when the water object V is farther away from the central range C of the monitoring screen 101, the processing module 300 controls the rotation of the camera 100 such that the rotation speed of the water object V back to the central range C of the monitoring screen 101 will be faster.

Figure 4:
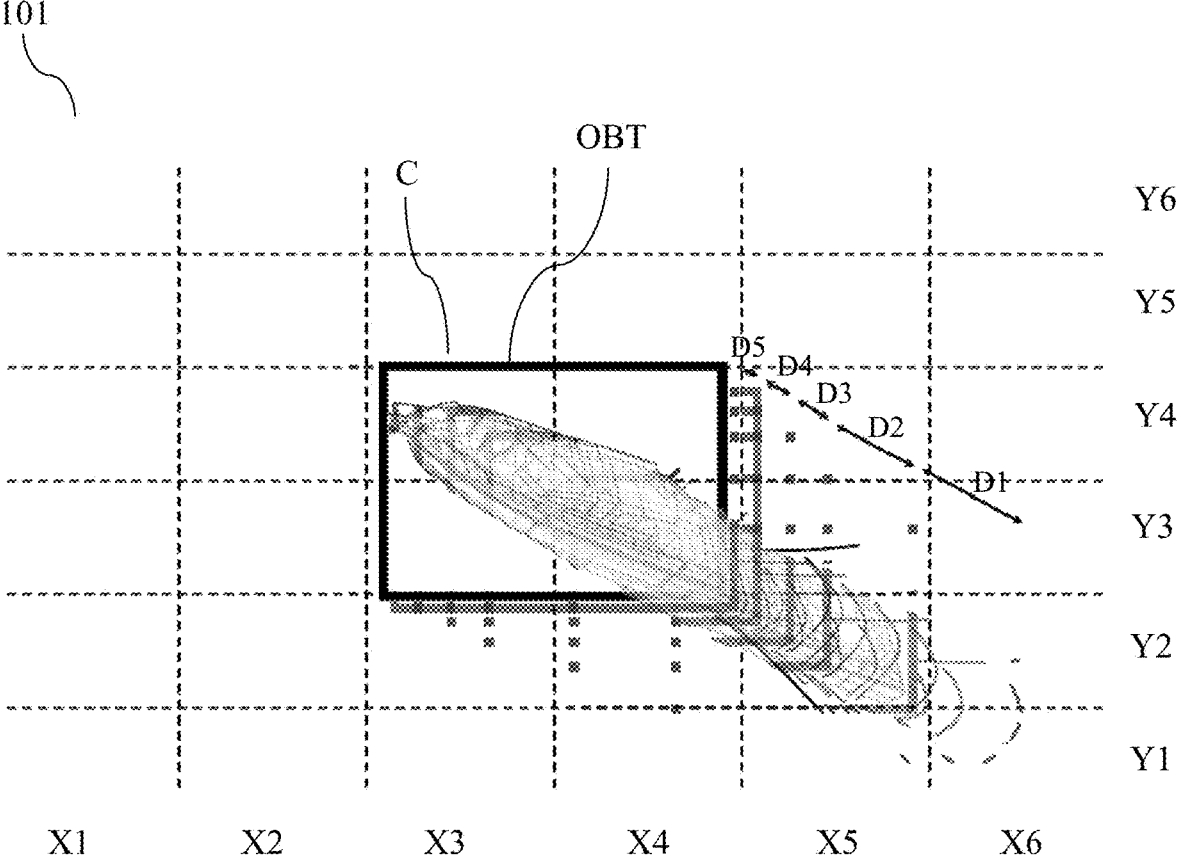
FIG. 4 illustrates a schematic diagram of adjustment of the monitoring screen of another embodiment of the vessel tracking and monitoring system of the present invention.
Figure 5:
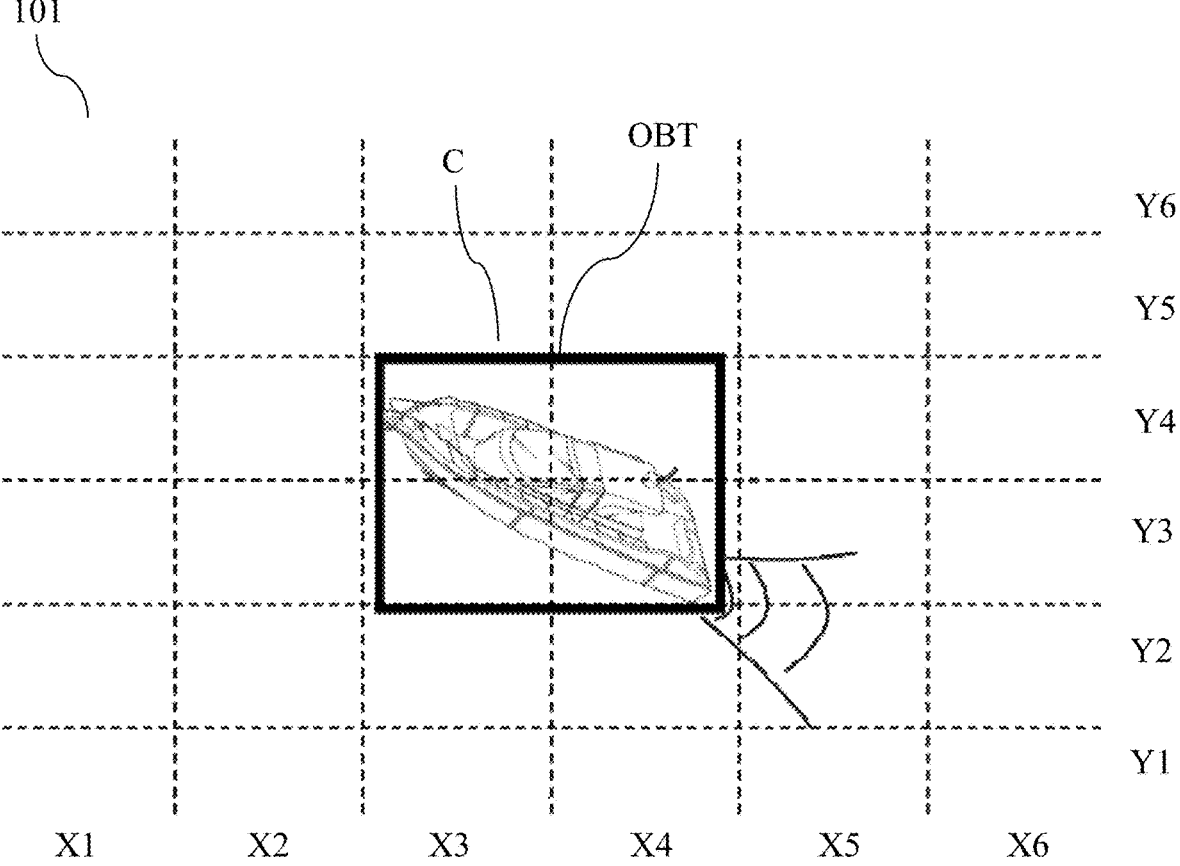
FIG. 5 illustrates a schematic diagram of adjustment of the monitoring screen of yet another embodiment of the vessel tracking and monitoring system of the present invention.

On the contrary, when the water object V gradually moves and closes to the central range C of the monitoring screen 101 while the camera 100 is rotating, the processing module 300 will control the camera 100 to gradually slow down its rotation speed, thereby keeping the water object V at the central range C of the monitoring screen 101 of the camera 100 at any time (refer to FIGS. 4 and 5).

On the other hand, the processing module 300 of this embodiment is connected with the storage module 400. Specifically, the storage module 400 of this embodiment can be a component such as a solid-state drive (SSD), which can store at least one data set of water objects. The at least one data set of water objects can be a data set of water objects that has manually marked samples and provided to the processing module 300 to detect and identify the location and type of water objects V. Therefore, the processing module 300 of this embodiment can actually include a central processing unit (CPU), a graphics processing unit (GPU) or a combination thereof for running image recognition artificial intelligence.

The storage module 400 can store an image recognition AI model that provides the processing module 300 to run and detect or identify the aquatic object V appearing on the monitoring screen 101. Of course, the image recognition AI model can also be accessed from the cloud server by the processing module 300 through the network, and the invention is not limited to such approach. Specifically, in this embodiment, the image recognition AI model run by the provided processing module 300 is yolov3-tiny. The artificial intelligence model of image recognition is trained by using at least one data set of water objects stored in the storage module 400, and is implemented after confirming that the accuracy rate of detection and identification reaches more than 85%.

Therefore, the image recognition artificial intelligence model trained and run by the processing module 300 in this embodiment may match with the hardware specification of the camera 100, and the accuracy ratio of detection and identification of the water object V within 1.5 kilometer (km) from the camera 100 can reach more than 85% without optical or digital amplification. In addition, after the image recognition artificial intelligence model running by the processing module 300 detects and identifies the water object V, the water object V can be kept within the central range C of the monitoring screen 101 to maintain the tracking range of 0.5 to 6 kilometers.

Then, please refer to FIG. 1 to FIG. 5. FIG. 2 illustrates the flow chart of the operation method of the embodiment of the vessel tracking and monitoring system of the invention. FIG. 3 illustrates the schematic diagram of adjustment of the monitoring screen of the embodiment of the vessel tracking and monitoring system of the invention. FIG. 4 illustrates a diagram of adjustment of the monitoring screen in another embodiment of the vessel tracking and monitoring system of the invention. FIG. 5 illustrates a diagram of adjustment of the monitoring screen in yet another embodiment of the vessel tracking and monitoring system of the invention.

Please also refer to FIG. 1 to FIG. 3. First, as shown in FIG. 2, the step (A) of this embodiment is to provide the vessel tracking and monitoring system 10 described in the previous embodiment (FIG. 1). The next step (B) is to keep at least one camera 100 on standby until at least one water object V as shown in FIG. 3 enters the photographing range of the at least one camera 100, and to transmit the monitoring screen 101 containing the at least one water object V to the processing module 300.

Specifically, the water object V that can be displayed in at least one monitoring screen 101 when entering the shooting range of at least one camera 100 in this embodiment can be not only a single water object V, but also multiple water objects V. However, the method described in the later part of the embodiment can detect and identify one by one when a plurality of water objects V are displayed on the monitoring screen 101, and lock (focus) the priority tracking objects according to the priority order of the tasks received by the processing module 300.

For example, the processing module 300 is set to list "warships" as the most priority tracking object during operation. Thereinafter, when the monitoring screen 101 shows a plurality of water objects V, after the task of detecting and identifying the plurality of water (aquatic) objects V is completed by the steps described later in this embodiment, if the plurality of water objects V includes a "warship" which has warship characteristics such as "naval gun" to be identified, the processing module 300 will give priority to tracking the water object V with "naval gun".

Thereafter, as shown in FIG. 2, the step (C) of this embodiment is that the processing module 300 performs the object detection based on at least one water object V on the at least one monitoring screen 101, and confirms the position of the at least one object V on the at least one monitoring screen 101. Specifically, the object detection mentioned herein refers to the image recognition AI model run by the processing module 300 of the embodiment, which is yolov3-tiny.

In this embodiment, the object detection means that the processing module 300 uses at least one data set of water objects stored in the storage module 400 to detect the position of the water object V. Furthermore, the image recognition artificial intelligence model is trained by using at least one data set of water objects stored in the storage module 400, and is implemented after confirming that the accuracy ratio of detection and identification reaches more than 85%. Of course, the processing module 300 can also use the image recognition artificial intelligence model stored in the cloud server (even the storage module 400 is the memory of the cloud server) to detect, identify or train the accuracy of detection and identification through the network.

Therefore, after the processing module 300 of this embodiment performs object detection and confirms the position of the at least one water object V on the at least one monitoring screen 101, there will be two specific situations. When a single water object V is detected, it can refer to FIG. 3, and the position of the water object V and where it is currently detected in the 2D coordinates of the monitoring screen 101 will be selected by the object detection OBT frame selection method. On the other hand, when the water objects V are a plurality of vessels, the monitoring screen 101 will show a plurality of object detection OBT. At the same time, the center of gravity of the multi deformable geometry formed by the connection of the center of gravity of the object detection OBT matrix will be used as the center position of the water objects V, and defining as the position of the water objects V on the monitoring screen 101 at two-dimensional coordinate.

Hence, referring to FIG. 3 of this embodiment as an example, when the processing module 300 runs the image recognition artificial intelligence model for detection, it can confirm the position of the water object V at the abscissa X5 and ordinate Y2 of the monitoring screen 101 according to the position of the object detection OBT matrix. For the convenience of description, the description of abscissa X1~X6 and ordinate Y1~Y6 in the later part of this embodiment is expressed in the form of (Xn, Yn); where n is between 1 and 6.

In addition, because the horizontal and vertical axes of the two-dimensional coordinate of the monitoring screen 101 in this embodiment are all even numbers, the definition of the central range C is composed of blocks divided by the middle two abscissa and vertical coordinates, including (X3, Y4), (X4, Y4), (X3, Y3) and (X4, Y3). Therefore, the step (D) is performed.

In the step (D) of this embodiment, the processing module 300 will control at least one camera 100 to rotate according to the distance between the position of the water object V (or multiple water objects V, the center of gravity of the multi deformable geometry formed by the connection of the center of gravity of the object detection OBT matrix) on the monitoring screen 101 and the central range C of the monitoring screen 101, and move the water object V to the central range C of the monitoring screen 101.

Specifically, with reference to FIG. 4, after the processing module 300 confirms the coordinate position of the water object V, it will gradually return the water object V to the central range C of the monitoring screen 101 from fast to slow by electromechanically controlling the camera 100 according to the distance between the aquatic object V (or the center of gravity of the multi deformable geometry formed by the connection of the center of gravity of the object detection OBT matrix of a plurality of water objects V objects) and the central range C of the monitoring screen 101, and make the camera 100 for focusing.

Specifically, when the coordinate determined by the object detection OBT matrix of the water object V is farther away from the central range C, the processing module 300 controls the rotation of the camera 100 to produce a maximum displacement D5. As the object detection OBT matrix of the water object V is getting closer and closer to the central range C of the monitoring screen 101, it obviously produces a control mode of the displacement D4~D1 gradually decreasing to zero. Therefore, the processing module 300 of this embodiment can maintain the water object V to be tracked in the center of the monitoring screen 101 for effective tracking by calculating that the distance between the object detection OBT matrix of water object V and the central range C is proportional to the displacement speed of the camera 100.

Therefore, in order to achieve this purpose, the camera 100 of this embodiment can select the camera 100 with multiple segments rotating speed. The segment-number of rotating speeds of the camera 100 can be determined according to the number of two-dimensional coordinates built in the monitoring screen 101. For example, the two-dimensional coordinates used in the monitoring screen 101 of this embodiment have six positions, regardless of abscissa or ordinate. Therefore, the rotation speed of the camera 100 should have at least zero to five levels and at least six speeds to provide the variation of rotation speed. Under this concept, other electromechanical control methods of camera 100 that are similar to the concept of this embodiment applied to vessel tracking should fall within the scope of this invention. In addition, the processing module 300 of this embodiment can update the two-dimensional coordinate position of the water object V on the monitoring screen 101 as frame by frame or fixed time update, which is not limited by the invention.

Therefore, as shown in FIG. 5, the step (E) of this embodiment is that the processing module 300 controls at least one camera 100 to keep the water object V (i.e. the object detection OBT matrix of water object V) within the central range C matrix of the monitoring screen 101 at any time, and moves away from the central range C matrix with the water object V shifting, so as to update the coordinate position of the object detection OBT matrix of water object V as frame by frame or at a fixed time. Finally, the processing module 300 will control the rotation of the camera 100 at any time by the updated coordinate position of the object detection OBT matrix of water object V.

Of course, in the step (E) of this embodiment, it continues to track the water object V, if the water object V is masked by at least one shelter on the monitoring screen 101, the processing module 300 will start the prediction method of object position to update the two-dimensional coordinate position of the water object V. The at least one shelter can be sea wave, spray or other water objects V under unexpected conditions, which is not limited.

The prediction method of object position described in this embodiment is to first execute the step (E1), and the processing module 300 will capture the first masked frame of the water object V that is masked by the shelter, and then in the step (E2), the processing module 300 will capture the second masked frame spaced at least one grid from the first masked frame.

Subsequently, in the step (E3), the processing module 300 will perform the object detection used in the step (C) for the part of the water object V that is not masked by the shelter according to the first masked frame and the second masked frame, and obtain the position of the first water object and the position of the second water object from the first masked frame and the second masked frame in sequence.

Finally, in the step (E4), the processing module 300 will judge the true position of the water object V based on the relative coordinates and the track of distance changes of the position of the first water object and the position of the second water object. On the other hand, the processing module 300 will take the true position of the water object V as the two-dimensional coordinates of the water object V, and keep the water object V at the central range C of the monitoring screen 101 at any time, until the shelter does not cover the water object V, then go back to the step (E) to continue.

In addition to the above methods, the prediction method of object position is started and executed to the step (E4) in this embodiment. After the step (E4) is completed, the processing module 300 will store the actual object position determined for this procedure in the storage module 400. Through the cumulative execution, the storage module 400 creates a masking prediction database. Accordingly, when the processing module 300 of this embodiment subsequently starts the prediction method of object position on demand again, it can more accurately judge the current real position of the water object V according to the masking prediction database in combination with the relative coordinates and the track of distance changes of the first and second water object positions.

Moreover, since the water object V is positioned at the central range C of the monitoring screen 101, the object recognition can be further performed on the water object V. Specifically, this embodiment more optionally includes the step (F) and the step (G), which are used for object recognition of water object V to confirm the category of water object V, so as to decide whether to continue tracking by the methods from the step (A) to the step (E).

Specifically, the object recognition is also achieved by the processing module 300 running the aforementioned image recognition artificial intelligence model. In this embodiment, the step (F) following the step (E) is that the processing module 300 uses at least one data set of water objects stored in the storage module 400 to distinguish the category of at least one water object V by object recognition.

In this embodiment, at least one class of water objects V includes, but is not limited to, container ships, oil tankers, fishing boats, yachts or warships. The recognizable vessel category in this embodiment is determined by the image recognition artificial intelligence model operated by the processing module 300. Furthermore, it is determined by the results of the aforementioned image recognition AI model for training the data content of the data set of water objects stored in the storage module 400.

In other words, if the image recognition artificial intelligence model run by the processing module 300 in this embodiment needs to be defined according to the classification of vessels in the Automatic Identification System (AIS), the data set of water objects stored in the storage module 400 should be image files including but not limited to the Wing In Grnd airfoil, hydrofoil, Patrol Vessel, Local vessel, Fishing vessel, Tug, Ferry, Dredger, Cruise ship, Naval ship, Container ship, Sailing vessel, Bulk carrier, Pleasure Craft, Tanker, Hovercraft, Submarine, search and rescue vessel, port tanker, pollution control vessel, hospital ship, special vessel, pilot vessel and distant ship.

In the following, the step (G) of this embodiment is that the processing module 300 decides whether to continue tracking the water object V according to the type of the water object V. In the step (G) of this embodiment, the processing module 300 determines whether to continue tracking the water objects V by manually setting the priority order, which is not limited by the invention. For example, when the port is expected to hold yacht carnivals and other activities, the continuous tracking of yachts will be listed in the first order for tracking. In contrast, other types of vessels will be excluded.

Therefore, if the processing module 300 decides to continue tracking the water object V, continue to execute the step (E) until the water object V leaves the shooting range of the camera 100. In this embodiment, the tracking distance that the camera 100 can withstand in its shooting range can be between 0.5 and 6 kilometers. If the processing module 300 decides not to continue tracking the water object V based on the category of the water object V, the processing module 300 will go back to the step (B) to find a new water object V.

Similarly, when the embodiment executes the step (F) to identify the category of the water object V, if the processing module 300 judges that the image-resolution of the water object V is not sufficiently on the monitoring screen 101 or the water object V is obscured by the mask, the processing module 300 will start a detailed object identification method.

Specifically, the detailed object identification method first executes the step (F1), and the processing module 300 controls the camera 100 to enlarge the water object V on the monitoring screen 101 by a magnification method. The amplification method includes but is not limited to controlling the camera 100 to increase the display area of the water object V by optical amplification, digital amplification or the combination thereof.

Subsequently, the step (F2) of this embodiment is that the processing module 300 runs the aforementioned image recognition artificial intelligence model based on the data set of the water object stored in the storage module 400, and performs an object recognition for at least one recognizable feature object on the water object V magnified by the amplification method. In this embodiment, the at least one recognizable feature object includes but is not limited to bow, stern, chimney, boom, lifeboat, flag, color, radar, naval gun, identification plate or the combination thereof. On the other hand, when there are special feature objects that need to be identified, it should be understood that the data set of water objects stored in the storage module 400 also has corresponding labeled relevant images and is provided to the image recognition artificial intelligence model for training.

Finally, the step (F3) is that the processing module 300 distinguishes the type of the water object V according to at least one identified feature object type, and then entering into the step (G).

In the steps (A) to (G) of the above embodiment, as long as any of the detection or identification steps encounters that the brightness of visible light of the monitoring screen 101 is lower than an identification brightness threshold, the processing module 300 will start at least one invisible camera 200 in FIG. 1, and the at least one invisible camera 200 will operate independently or as an auxiliary for the camera 100 according to the steps (A) to (F). The identification brightness threshold of this embodiment can be set to be realized by using an external light sensor of the camera 100, which is not limited.

Specifically, it can be a light sensor connected with the processing module 300. The light sensor can measure the lumen (lm) value of the ambient visible light to determine whether it is cloudy or not, or it can be various weather sensors (such as barometer, hygrometer, suspended microparticle sensor or thermometer) connected with the processing module 300, starting the invisible light camera 200 by determining whether weather conditions may obscure or hinder the camera 100 from receiving visible light.

Similarly, in the steps (A) to (G) of the above embodiment, as long as there is any step of detection or identification, when at least one water object V appearing on the monitoring screen 101 passes the object detection of the step (C), it is found that the area of the object detection OBT matrix on the monitoring screen 101 is less than an area threshold, and the processing module 300 can then control the camera 100 to magnify the at least one water object V by the aforementioned amplification method. The area threshold can be the percentage (%) of the area of the object detection OBT matrix of the water object V on the monitoring screen 101, and the invention does not limit it.

In addition, in the above steps (A) to (G) of this embodiment, especially the step (E) during execution, if the processing module 300 can continuously maintain the water object V on the central range C of the monitoring screen 101 without controlling the rotation of the camera 100, and exceeds a time threshold, the processing module 300 can further start the above steps (F1) to (F3) to identify whether the water object V has images such as flame or smoke appearing on the screen. If the water object V is identified with images such as firelight or smoke, the processing module 300 can send a warning signal to at least one terminal device, such as the mobile phone and computer of the port management personnel, through wired or wireless communication, to remind the current emergency that the water object V may encounter.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

10

What is claimed is:

1. A vessel tracking and monitoring system, comprising:
   at least one camera, having at least three-dimensional camera movement capability, and capturing at least one monitoring picture;
   a processing module connected with said at least one camera, said processing module performs an object detection based on at least one water object on said at least one monitoring picture and confirms a location of said at least one water object on said at least one monitoring picture, controlling a rotation of said at least one camera to move said at least one water object to a central range of said at least one monitoring picture based on a distance between said location of said at least one water object on the at least one monitoring picture and said central range of said at least one monitoring picture, and keeping said at least one water object at said central range of said at least one monitoring picture; and
   a storage module connected with said processing module to store at least one data set of said at least one water object, wherein said at least one data set of said at least one water object provides for the processing module to detect and identify said said location and category of said at least one water object;
   wherein said storage module creates a masking prediction database;
   wherein said processing module starts a prediction method of object position, said processing module more accurately judges the current real position of said at least one water object according to said masking prediction database in combination with a relative coordinate and a track of distance change of said at least one water position.

2. The vessel tracking and monitoring system of claim 1, wherein said processing module includes a central processing unit.

3. The vessel tracking and monitoring system of claim 2, wherein said processing module further includes a graphics processing unit.

4. The vessel tracking and monitoring system of claim 1, further comprising at least one invisible camera coupled to said processing module.

5. The vessel tracking and monitoring system of claim 1, wherein said at least one camera is capable of sensing invisible light.

6. The vessel tracking and monitoring system of claim 1, wherein a rotation angle of said at least one camera per second is between 0 and 120 degrees.

7. The vessel tracking and monitoring system of claim 1, wherein said at least one water object includes an aquatic vehicle.

8. The vessel tracking and monitoring system of claim 1, wherein said at least one water object includes a boat, a drifter, a life buoy or the combination thereof.

9. An operating method of a vessel tracking and monitoring system, comprising:
   (A) providing a vessel tracking and monitoring system as claimed in claim 1;
   (B) keeping at least one camera on standby until said at least one water object enters a photographing range of said at least one camera, and transmitting at least on monitoring picture containing said at least one water object to said processing module;
   (C) performing said object detection based on said at least one water object on said at least one monitoring picture by said processing module, and confirming said location of said at least one water object on said at least one monitoring picture;

(D) controlling said at least one camera to rotate by said processing module based on said distance between said location of said at least one water object on said at least one monitoring picture and a central range of said at least one monitoring picture, and move said at least one water object to said central range of said at least one monitoring picture; and (E) controlling said at least one camera by said processing module to keep said at least one water object within said central range of said at least one monitoring picture.

10. The operating method of a vessel tracking and monitoring system of claim 9, wherein, after said step (E), further comprising:

(F) using a data set of said at least one water object stored in a storage module to distinguish a type of said at least one water object through an object recognition by said processing module; and (G) determining whether to continue tracking said at least one water object based on said type of said at least one water object by said processing module;

in said step (G), if said processing module determines to continue tracking said at least one water object, continue to execute said step (E) until said at least one water object leaves said photographing range of said at least one camera; if the processing module determines not to continue tracking said at least one water object, go back to said step (B).

11. The operating method of a vessel tracking and monitoring system of claim 9, wherein said object detection in said step (C), is using said data set of said at least one water object stored in said storage module to obtain said location of said at least one water object by said processing module.

12. The operating method of a vessel tracking and monitoring system of claim 10, wherein said object recognition in said step (F), is using said data set of said at least one water object stored in said storage module to identify a category of said at least one water object by said processing module.

13. The operating method of a vessel tracking and monitoring system of claim 9, in said step (E), when said at least one water object on said at least one monitoring picture is shielded by at least one shelter, starting said prediction method of object position, which comprises:

(E1) using said processing module to capture a first masked frame of said at least one water object that is shielded by said at least one shelter;

(E2) capturing a second masked frame spaced at least one grid from said first masked frame by said processing module;

(E3) using said processing module to perform said object detection on a part of said at least one water object that is not shielded by said at least one shelter based on said first masked frame and said second masked frame, and obtain a position of a first water object and a position of a second water object in sequence; and (E4) using said processing module to judge a true position of said at least one water object based on said relative coordinate and said track of distance change of said position of said first water object and said position of said second water object, and keep said at least one water object at said central range of said at least one monitoring picture based on said true position of said at least one water object, until said at least one shelter does not shield said at least one water object, then go back to said step (E).

14. The operating method of a vessel tracking and monitoring system of claim 13, after said step (E4), further comprising:

said true position of said at least one water object is stored on said storage module by said processing module such that said storage module creates said masking prediction database.

15. The operating method of a vessel tracking and monitoring system of claim 14, wherein said step (E4), further comprising using said processing module to judge said true position of said at least one water object based on said masking prediction database, said relative coordinate and said track of distance change of said position of said first water object and said position of said second water object.

16. The operating method of a vessel tracking and monitoring system of claim 10, wherein said step (F), if said processing module judges that an image-resolution of said at least one water object is not sufficiently on said at least one monitoring picture or said at least one water object is shielded by said at least one shelter, said processing module starts a detailed object identification process, which comprises:

(F1) controlling said at least one camera by said processing module to enlarge said at least one water object on said at least one monitoring picture by a magnification process;

(F2) performing an object recognition for at least one recognizable feature object on said at least one water object by said processing module based on said data set of said at least one water object stored in said storage module; and (F3) identifying a type of said at least one water object based on a type of said at least one recognizable feature object by said processing module, and then entering said step (G).

17. The operating method of a vessel tracking and monitoring system of claim 16, wherein said magnification process includes an optical amplification, a digital amplification or the combination thereof.

18. The operating method of a vessel tracking and monitoring system of claim 16, wherein said at least one recognizable feature object includes bow, stern, chimney, boom, lifeboat, flag, color, radar, naval gun, identification plate or the combination thereof.

19. The operating method of a vessel tracking and monitoring system of claim 10, wherein when a visible light brightness of said at least one monitoring picture is lower than an identification brightness threshold, said processing module starts at least one invisible camera, and said at least one invisible camera operates according to said steps (A) to (F).

20. The operating method of a vessel tracking and monitoring system of claim 10, wherein when an area of said at least one water object on said at least one monitoring picture by said object detection is less than an area threshold, said processing module controls the at least one camera to magnify said at least one water object on said at least one monitoring picture by an amplification process.

21. The operating method of a vessel tracking and monitoring system of claim 9, in said step (E), if said at least one camera can keep said at least one water object on said central range of said at least one monitoring picture without rotating for more than a time threshold, said processing module sends a warning signal to at least one terminal device through wired or wireless communication.

* * * * *